United States Patent [19]

Shieh

[11] Patent Number: 5,359,803
[45] Date of Patent: Nov. 1, 1994

[54] ADJUSTABLE POLE REST

[76] Inventor: Gwo-Nan Shieh, No. 439, Min-Tsu 1st Rd., Kaohsiung,

[21] Appl. No.: 144,521
[22] Filed: Nov. 2, 1993
[51] Int. Cl.⁵ .......................................... A01K 97/10
[52] U.S. Cl. ...................................... 43/21.2; 248/530
[58] Field of Search .................. 43/21.2; 248/530, 533, 248/534, 538

[56] References Cited

U.S. PATENT DOCUMENTS

| | | | |
|---|---|---|---|
| 1,091,491 | 3/1914 | Ebur | 248/533 |
| 2,211,278 | 8/1940 | LeFelve | 43/21.2 |
| 2,438,388 | 3/1948 | Dolk | 43/21.2 |
| 2,555,982 | 6/1951 | Mart | 43/21.2 |
| 2,642,692 | 6/1953 | Smith | 43/21.1 |
| 2,752,115 | 6/1956 | Green | 43/21.2 |
| 3,636,649 | 1/1972 | Paiva | 248/530 |
| 4,177,595 | 12/1979 | Chon | 43/21.2 |

FOREIGN PATENT DOCUMENTS 2602646  2/1988  France ................. 43/21.2

Primary Examiner—Kurt C. Rowan
Attorney, Agent, or Firm—Varndell Legal Group

[57] ABSTRACT

An adjustable pole rest includes a supporting device which consists of two telescopic rods connected by a connector for supporting a fishing rod, a mounting device fastened to the ground to support the supporting device, a balancing device fastened to the ground to balance the positioning of the mounting device on the ground, and a swivel coupling device connected between the supporting device and the mounting device for permitting the supporting device to be turned horizontally on the mounting device to change the position of the fishing pole.

1 Claim, 5 Drawing Sheets

ADJUSTABLE POLE REST

BACKGROUND OF THE INVENTION

The present invention relates to an adjustable pole rest which is stable in use and can be conveniently adjusted to change the position and direction of the fishing pole being carried thereon.

Fishing is one of the most widely accepted outdoor activities. However, the arms will ache if to hold the fishing pole for a length of time. Various pole rests have been disclosed for supporting a fishing pole in the fishing. FIGS. 1, 2, 3, and 4 show a pole rest according to the prior art, which is generally comprised of a mounting rod fastened to the ground, a telescopic vertical rod and a telescopic horizontal rod connected at right angles and supported on the mounting rod to hold the fishing pole. This structure of pole rest has drawbacks. Because the forked front pole resting tip on either telescopic rod has a smooth outside surface, the fishing pole will slip when supported (see FIG. 1). Because the forked mounting tip of the mounting rod of the is not adjustable (see FIG. 2), it may sink in sandy soil, causing the fishing pole oscillated. Because the rod sections of the telescopic vertical and horizontal rods are respectively fastened with one another through screw joints, it is not convenient to adjust the length of the rods (see FIG. 3). Furthermore, the dents on the rods of this structure of pole rest for decoration make the rods easy to be contaminated, and therefore it is not easy to clean the pole rest after each use.

SUMMARY OF THE INVENTION

The present invention has been accomplished to provide a pole rest which eliminates the aforesaid drawbacks. According to the preferred embodiment of the present invention, the pole rest is comprised of a supporting device which consists of two telescopic rods connected by a connector for supporting a fishing rod, a mounting device fastened to the ground to support the supporting device, a balancing device fastened to the ground to balance the positioning of the mounting device on the ground, and a swivel coupling device connected between the supporting device and the mounting device for permitting the supporting device to be turned horizontally on the mounting device to change the position of the fishing pole. The rod sections of the telescopic rods are made of half-round shape in section, each rod section having a smooth outside surface. Therefore, the rod sections can be firmly retained in position once they are adjusted, and dust and dirts will not adhered to the outside surface of the rod sections easily. The pole resting tip of either telescopic rod is respectively attached with a V-shaped non-skid pad, and therefore the fishing pole which is carried thereof does not slip. Rubber sockets of different sizes are respectively mounted on either telescopic rod to connect the rod sections with one another for permitting the respective telescopic rod to be conveniently adjusted to the desired length. When not in use, the telescopic rods of the mounting device can be collapsed, and the balancing device and the fork of the of mounting device can be dismantled, and therefore the storage space of the pole rest is greatly reduced.

DETAILED DESCRIPTION OF THE PREFERRED EMBODIMENT

Turning now to the annexed drawings in detail, therein shown in an adjustable pole rest according to the preferred embodiment of the present invention generally comprised of a supporting device 1, a swivel coupling device 2, a balancing device 3, and a mounting device 4.

Figure 1:
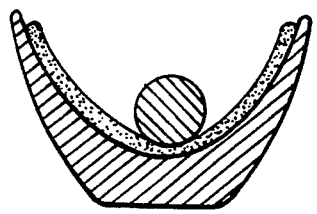
FIG. 1 is a cross section showing the structure of the pole resting tip of a pole rest according to the prior art.
Figure 2:
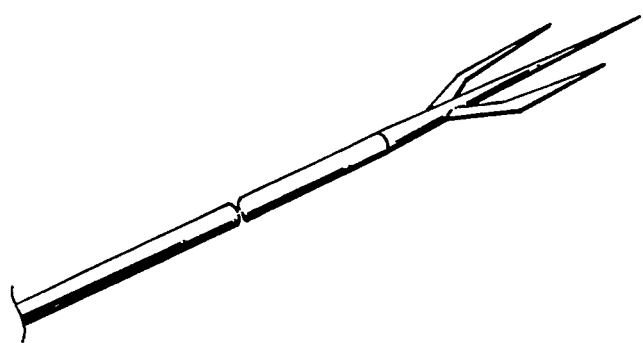
FIG. 2 shows the mounting rod of the prior art pole rest.
Figure 3:
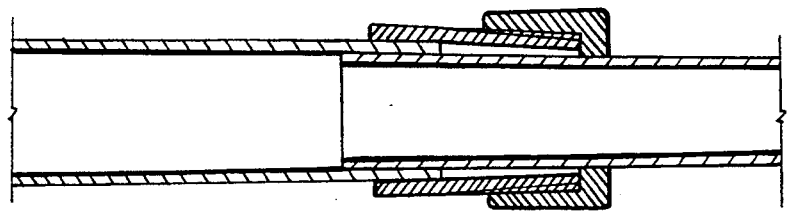
FIG. 3 is a longitudinal view in section of the supporting rod of the prior art pole rest.
Figure 4:
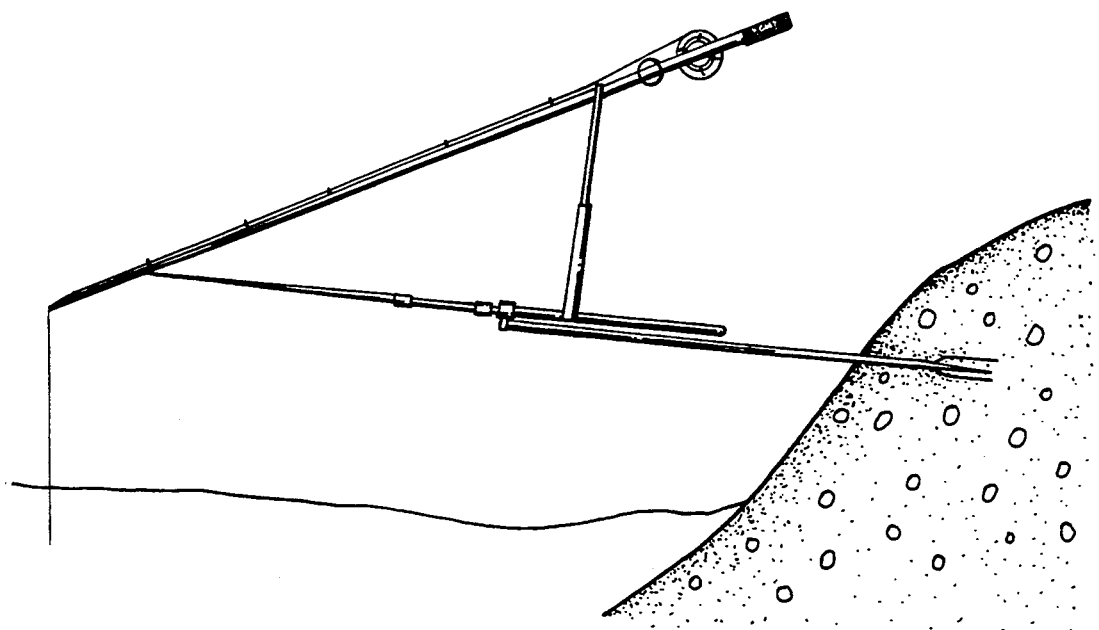
FIG. 4 shows the prior art pole rest fastened to the ground to support a fishing pole.
Figures 5, 6, 6A:
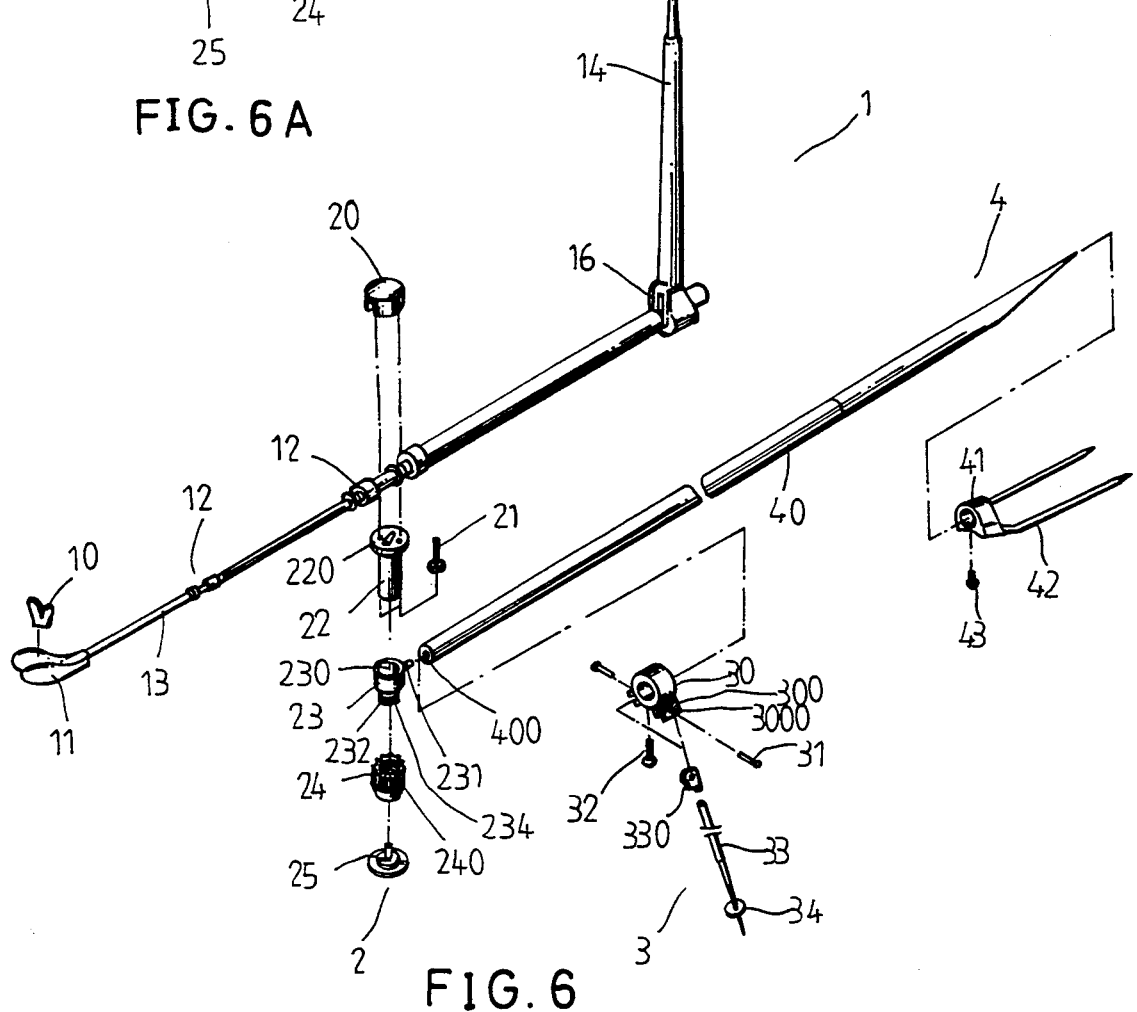
FIG. 5 is a cross section of the supporting rod of the prior art pole rest.
FIG. 6 is an exploded view of an adjustable pole rest according to the preferred embodiment of the present invention.
FIG. 6A is a sectional view showing the swivel coupling device of the adjustable pole rest of FIG. 6 fastened to the locating rod of the mounting device thereof.
Figure 8:
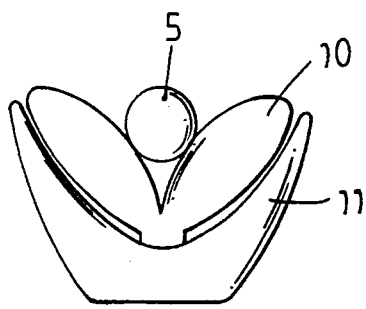
FIG. 8 is a sectional view showing a V-shaped non-skid pad attached to the U-shaped pole resting tip of the first telescopic rod of the supporting device of the adjustable pole rest of FIG. 6 to hold a fishing pole.
Figure 9:
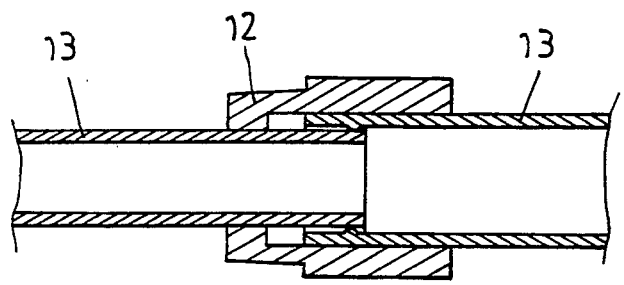
FIG. 9 is a longitudinal view in section of the first telescopic rod of the supporting device of the adjustable pole rest of FIG. 6.
Figure 10:
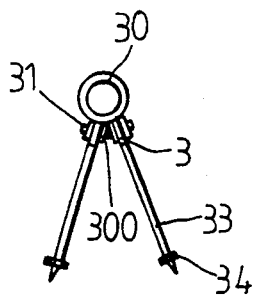
FIG. 10 is a front view of the balancing device of the adjustable pole rest of FIG. 6.

Referring to FIGS. 6, 8, and 9, the supporting device 1 is comprised of a first telescopic rod 13, a second telescopic rod 14, and a connector 16 to connect the second telescopic rod 14 to the first telescopic rod 13 permitting the second telescopic rod 14 to be turned back and forth and then fixed in a desired angular position on the first telescopic rod 13. The first telescopic rod 13 is comprised of a plurality of sections that slide one inside another. A plurality of rubber sockets 12 of different sizes are respectively mounted on the first telescopic rod 13 around the connecting area between sections thereof to hold the sections in respective positions after they are adjusted (see FIG. 9). The front end of the first telescopic rod 13 is terminated to a U-shaped pole resting tip 11 attached with a V-shaped non-skid pad 10 to support one end of the fishing pole 5 (see FIG. 8). The second telescopic rod 14 can be extended out and then set at the desired length. The front end of the second telescopic rod 14 terminates to a U-shaped pole resting tip 15 to support the opposite end of the fishing pole. The rod sections of the first telescopic rod 13 as well as the second telescopic rod 14 are preferably made of half-round shape in cross section so that they can be firmly retained one inside another when adjusted.

Figure 11:
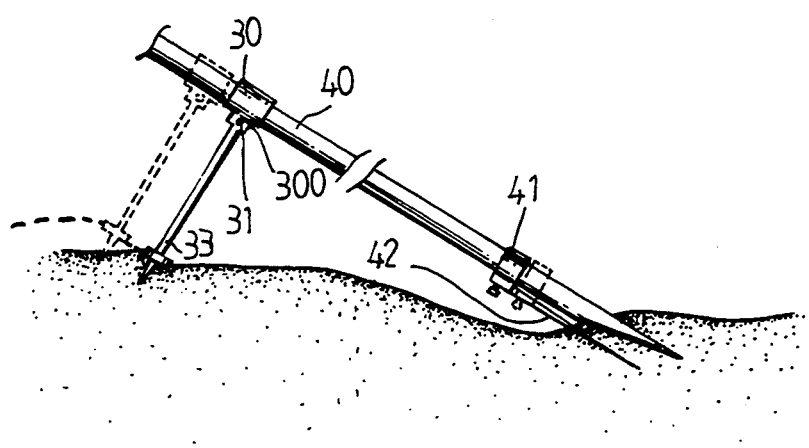
FIG. 11 shows the mounting device of the adjustable pole rest of FIG. 6 fastened to the ground and supported on the balancing device thereof.

Referring to FIG. 11 and FIG. 6 again, the mounting device 4 is comprised of a locating rod 40 having an end hole 440 on the rear end of thereof, and a fork 42 with a mounting frame 41 fastened to the locating rod 40 by a tightening up screw 43.

Figure 7:
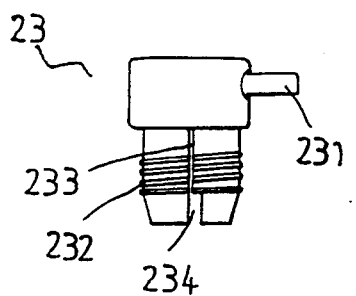
FIG. 7 is a front view of the split screw member of the swivel mounting device of the adjustable pole rest of FIG. 6.

Referring to FIGS. 6A and 7, the swivel coupling device 2 comprises a grooved cap 20, a rotating member 22, a split screw member 23, a screw nut 24, and a plug 25 having a rod extending therefrom. The grooved cap 20 is fastened to the head 220 of the rotating member 22 by screws 21 to retain the rotating member 22 to the first telescopic rod 13. The split screw member 23 comprises a top blind hole 230, which receives the rotating member 22 permitting it to be turned on the inside (therefore the first telescopic rod 13 can be turned horizontally), a horizontal side rod 231 fitted into the end hole 400 on the locating rod 40 of the mounting device 4, and a split screw rod 232 having a split 233 terminated to a bottom hole 234. The screw nut 24 has an inner thread 240 threaded onto the split screw rod 231 of the split screw member 23. Before tightening the screw nut 24, the rod of the plug 25 is inserted through the screw nut 24 into the bottom hole 234 on the split screw member 23. After the screw nut 24 was tightened up, the plug 25 becomes firmly retained to the split screw member 23.

Referring to FIGS. 6 and 11 again, the balancing device 3 is comprised of a mounting socket 30 fastened around the locating rod 40 of the mounting device 4 and locked in position by a tightening up screw 32, two telescopic legs 33 respectively connected to the mounting ring 30. The mounting socket 30 comprises two spaced lugs 300 having a respective pin hole 3000. Each telescopic leg 33 has a top end coupled with a mounting plate 330 fastened to the pin hole 3000 on either lug 300 by a pin 31. A circular stop plate 34 is respectively fastened around each telescopic leg 33 for supporting on the ground (See FIG. 11).

When in use, the locating rod 40, the fork 42, and the legs 33 are respectively pierced into the ground permitting the stop plates 34 supported above the ground. When installed, the length of the first telescopic rod 13 as well as the second telescopic rod 14 can be respectively adjusted, and the supporting device 1 can be turned horizontally on the mounting device 4 to change the position of the fishing pole.

I claim:

1. An adjustable pole rest comprising:

a mounting device fastened to the ground, said mounting device comprised of a locating rod having a pointed front end pierced into the ground and a rear end made with an end hole, and a fork fastened to the pointed front end of said locating rod by a tightening up screw;

a balancing device to support said locating rod on the ground, said balancing device comprising a mounting socket fastened around said locating rod and locked in position by a tightening up screw, two telescopic legs fastened to lugs on said the mounting socket of said balancing device by pins and respectively pierced into the ground to support said mounting socket above the ground, said telescopic legs having a respective circular stop plate spaced above a respective bottom end for supporting on the ground;

a supporting device to support a fishing rod on said locating rod, said supporting device comprising a first telescopic rod, a second telescopic rod, and a connector to connect said second telescopic rod to said first telescopic rod permitting said second telescopic rod to be adjusted to a desired angular position on said first telescopic rod within a fixed angle, said first telescopic rod comprised of a telescopic rod body which consisted of a plurality of half-round rod sections that slide one inside another, a plurality of rubber sockets to hold the half-round rod sections of the telescopic rod body of said first telescopic rod to one another, a forked pole resting tip connected to one end of the telescopic rod body of said first telescopic rod and attached with a V-shaped non-skid pad to support a fishing pole at one end, said second telescopic rod comprised of a telescopic rod body which consists of a plurality of half-round rod sections that slide one inside another, and a U-shaped pole resting tip connected to one end of the telescopic rod body of said second telescopic rod to support said fishing pole at an opposite end; and a swivel coupling device connected between said supporting device and said mounting device for permitting said supporting device to be turned on said mounting device horizontally, said swivel coupling device comprising a grooved cap mounted on said first telescopic rod of said supporting device, a rotating member connected to said grooved cap by screws permitting said first telescopic rod of said supporting device to be retained between said grooved cap and said rotating member, a split screw member fastened to said locating rod of said mounting device to support said rotating member, a screw nut fastened to said split screw member, and a plug fastened to said split screw member and said screw nut, said split screw member comprising a side rod fitted into said end hole of said locating rod, a top blind hole, which receives said rotating member permitting said rotating member to be turned on said split screw member, and a split screw rod having a bottom hole, said screw nut being threaded onto said split screw rod of said split screw member, said plug having a rod inserted through said screw nut into the bottom hole on said split screw rod and being firmly retained to said screw nut and said split screw member upon tightening of said screw nut on said split screw member.

* * * * *